March 12, 1935. W. W. MACFARREN 1,994,107
SYNCHRONIZING MECHANISM FOR ROTARY FLYING SHEARS
Filed Aug. 11, 1932 2 Sheets-Sheet 1
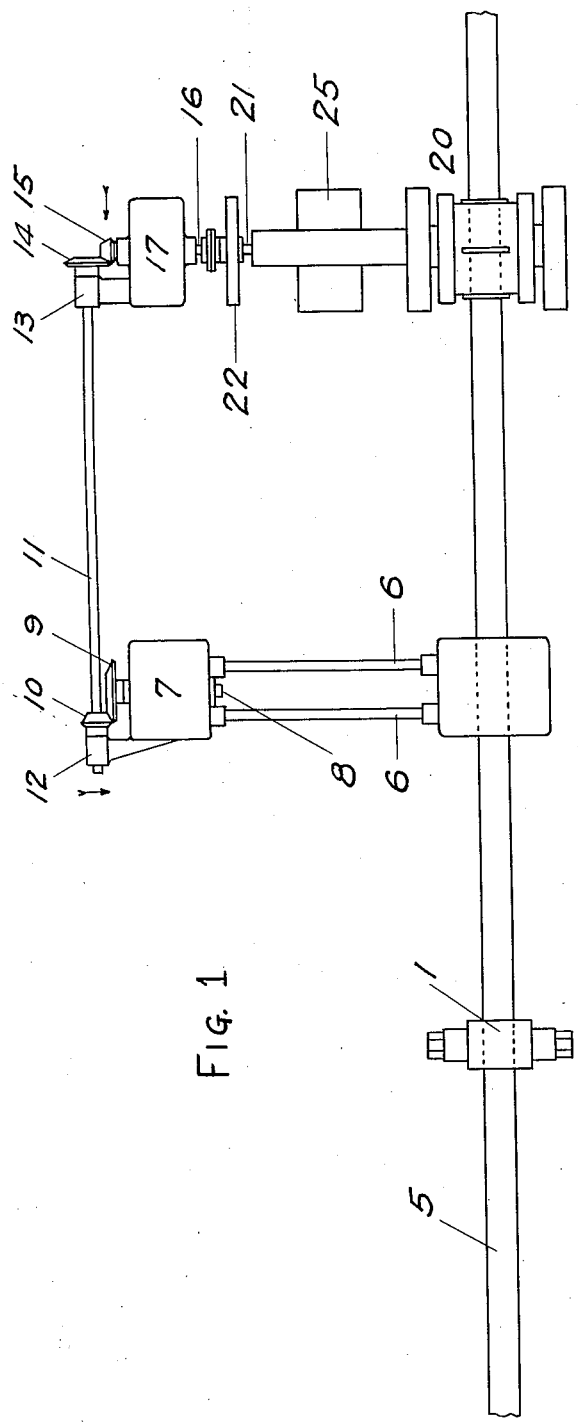
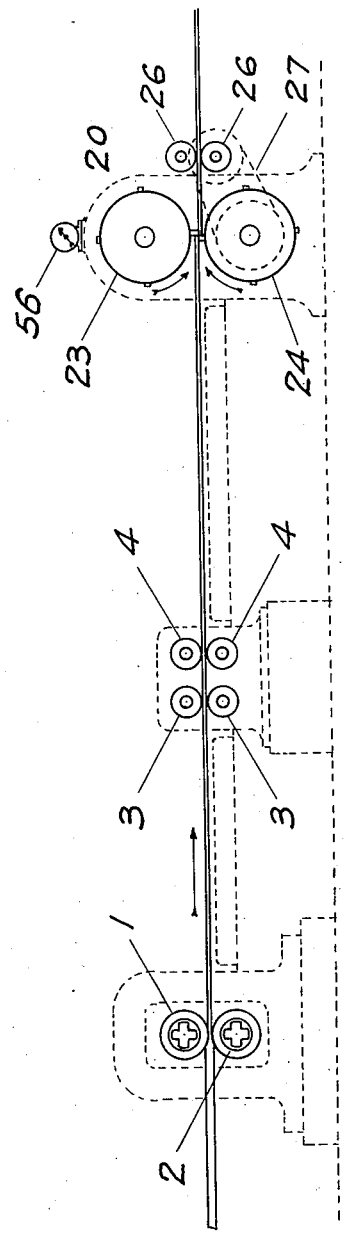
INVENTOR.
Walter W. Macfarren Patented Mar. 12, 1935

1,994,107

UNITED STATES PATENT OFFICE 1,994,107

SYNCHRONIZING MECHANISM FOR ROTARY FLYING SHEARS

Walter W. Macfarren, Los Angeles, Calif.

Application August 11, 1932, Serial No. 628,316

16 Claims. (Cl. 164—68)

My invention relates to mechanism for synchronizing the speed of a flying shear with the speed of a moving metal bar, as it is delivered from one stand of rolls of a rolling mill.

The mechanism herein described may be used in connection with any flying shear comprising a pair of rotary members provided with cutting knives, but this mechanism is particularly adapted for use with the shear shown in U. S. Patent to Macfarren et al. No. 1,849,501, or to the shear shown in applicant's co-pending application Serial No. 354,414.

The prime purpose of both of these machines is to cut equal sections of accurate length from a moving bar coming from the mill rolls, and while the bar is still being rolled.

The machines disclosed in the application and patent referred to, both show means for cutting accurate length sections from a moving bar, provided the shear itself can be accurately synchronized with the speed of the bar.

There are three ways known to me to drive such a shear, as follows:

1st. An independent drive for the shear by means of a variable speed motor, by the use of which even an alert and experienced shear operator could secure only approximations to accuracy in cut section lengths, due to the inevitable speed variations in both the mill and the shear driving motor.

2nd. The shear may be driven by gearing or other mechanical connection from the mill itself. This method might produce accurate results for one diameter of mill rolls, but as the rolls wear and are dressed the synchronization between the bar and the shear would be destroyed.

Such a device, to be a complete solution, would have to include a very accurately adjustable variable speed drive, which is in itself a difficult achievement.

3rd. The third way of synchronizing the speed of the bar to be severed and the shear to sever it, is by use of the mechanism hereinafter described. The various conditions to be met may be illustrated by the following statement:

1. The mill dominates the speed of the oncoming bar as long as it is in the mill rolls, and the R. P. M. of the mill itself may vary as much as 10%. The mill rolls are of various diameters in the same mill, due to wear and redressing of the rolls, and these diameters may vary on the same day (due to a roll change) as much as 10% on the smaller mills.

2. No electric motor for an individual shear drive can be electrically governed to operate with much less than a 5% speed variation. If the required accuracy on a cut section 100 inches long is $\frac{1}{16}$ inch, it would require synchronization between the bar speed and the shear speed within $\frac{1}{16}$ of 1%.

3. We therefore have no adequate control over either the speed of the mill, which controls the bar speed, or over an independent driving motor (by any usual controls, or in any usual manner).

We can however, for all usual bar sections, control the comparative speed of the bar and the shear with minute accuracy by connecting the shear to the moving bar, in such a manner that the bar dominates the speed of the shear while the bar is still engaged by the mill rolls, although the actual driving force for the shear may come from an individual motor.

It will be obvious that the forward motion of the bar cannot be used to push, and thus drive the shear. There then remains the possibility of driving the shear by an individual motor, and controlling the speed of the shear, and of its driving motor, when the bar is engaged both by the mill and the shear, by gripping the bar by moving mechanism, and by putting the bar in tension to use its unyielding movement to control accurately by its own progression, the speed of the shear. It is on this principle that the present invention is based, as will now be shown.

To illustrate my invention I provide the accompanying drawings in which Fig. 1 is a diagrammatic plan view of a stand of mill rolls, a stand of pinch rolls, and a rotary flying shear.

Fig. 2 is an elevation of the same.

Figure 3:
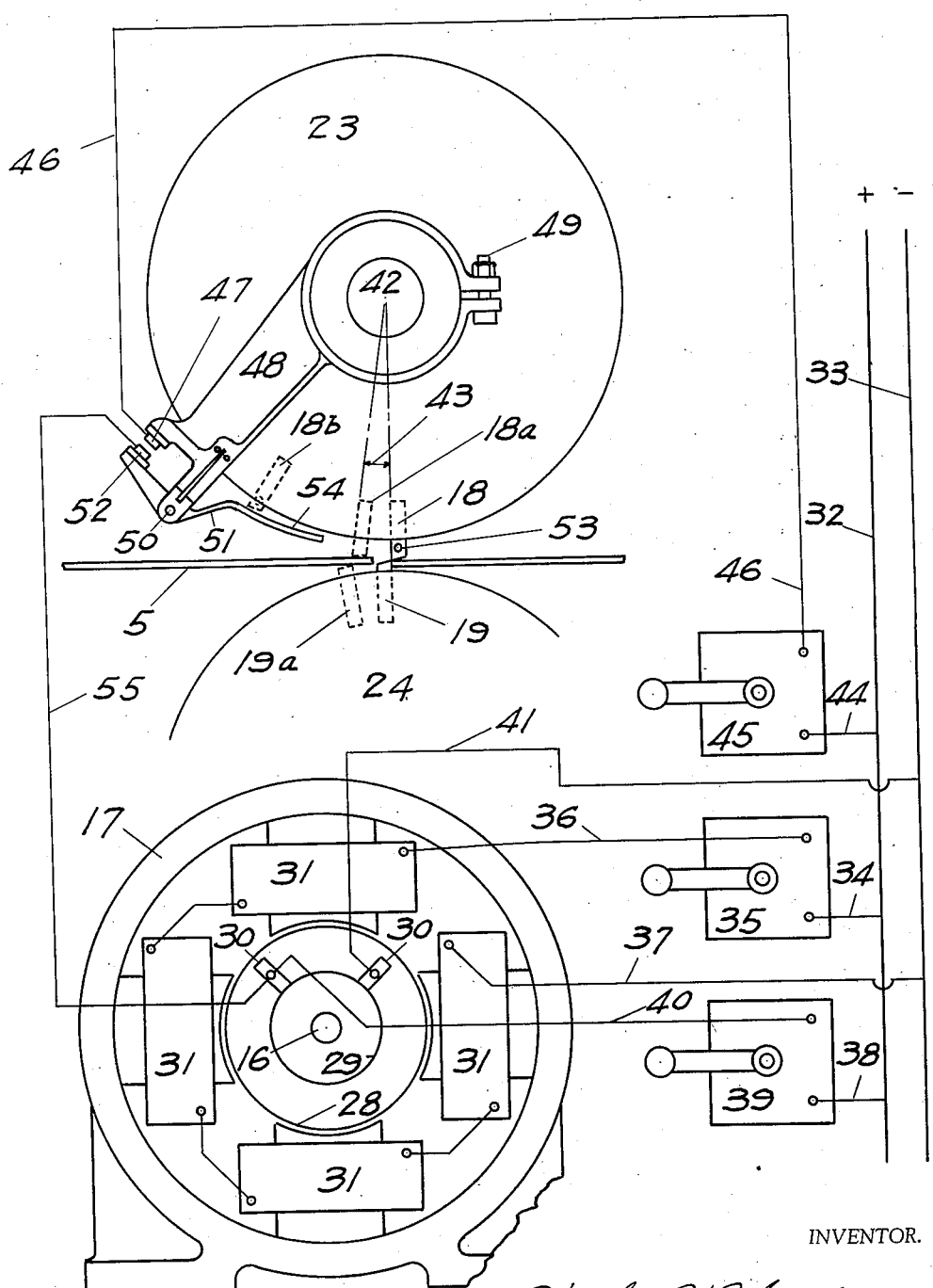
Fig. 3 is a diagram showing the electrical circuits to the driving motor, and an automatic booster switch, to supply current thereto.

The mill rolls 1 and 2 may be of any usual construction, and driven in any desired manner. These rolls will usually be the finishing stand of a hot mill. It is, however, only essential that these are the rolls from which the bar is passed to the shear, to be cut into sections.

The pinch rolls 3—3 and 4—4 may be of any usual construction, and set up by springs or air cylinders, to get a grip on the bar 5. If air cylinders are used the amount of the grip is easily regulated by changing the air pressure. Any desired number of tandem pairs of pinch rolls may be used to get any desired grip on the bar, and a tachometer 56 for speed indications may be mounted as shown.

The distance between the mill rolls and the pinch rolls may be any convenient distance from 10 to 100 feet, or more. The distance between the pinch rolls and the shear should be less than the minimum length section to be cut from the bar. Any convenient means may be employed for supporting the bar between the mill and the pinch rolls, and between the latter and the shear.

The pinch rolls 3—3 and 4—4 are individually driven by spindles 6, one for each pinch roll, and these spindles are driven by a nest of gears contained in a gear casing 7, and driven by a shaft 8, all in the usual manner.

The shaft 8 is provided with a bevel gear 9, which is driven by a bevel pinion 10 on the shaft 11; the latter being supported in suitable bearings 12 and 13. The shaft 11 carries a bevel gear 14, which is driven by a bevel pinion 15 on the armature shaft 16, of the motor 17.

These four bevel gears would usually be enclosed, and their combined gear ratio is such that the surface speeds of the pinch rolls 3 and 4 are exactly equal (or as nearly as may be, in a commercial sense) to the surface speed of the cutting edges of the shear knives 18 and 19, of the shear 20. (See Fig. 3).

The motor shaft 16 is coupled to a drive shaft 21, which, if desired, may have a fly wheel 22. The shaft 21 drives the shear drums 23 and 24 through suitable gearing contained in the gear case 25, as set forth in the applications before referred to. A similar arrangement would apply for rotary shears of other types.

A pair of pinch rolls 26—26 is provided close to the delivery side of the shear 20, which rolls may be driven in any convenient way as by the chain drive 27.

The motor 17 is provided with an armature 28, a commutator 29, brushes 30—30, and field coils 31. Current flows from the line 32 through a wire 34 to a field rheostat 35, and thence through a wire 36 and the field coils 31, to a wire 37 leading to the line 33.

For the primary armature circuit, current from line 32 flows through a wire 38 to a rheostat 39, and thence through a wire 40 to one motor brush 30, and thence through the armature coils and out to line 33, through the other brush 30 and the wire 41.

The upper half of Fig. 3 shows the shear drums 23—24, and the upper drum shaft 42. It will be observed that the cutting action is completed when the knives are in the position shown at 18 and 19, and that the same begins with the knives as shown at 18a and 19a, the cut being made while the knives swing through the small angle 43.

Since the shear in normal use seldom cuts more than once in two revolutions of the drums 23 and 24, it will be seen that only a small amount of power is needed to keep it rotating in readiness for cutting, which during the travel through the angle 43 during which time the cut is made, a large amount of power may be needed for a short time.

Ordinarily, such conditions could be fully met by the use of an ample fly wheel, but due to circumstances which will be more fully appreciated later, I prefer to supply this "cutting power" by an automatic booster switch, as needed.

In my rotary shear applications herein referred to the shear is provided with from one to 4 pairs of cutting knives, co-acting in pairs. These knives are all normally drawn out of cutting range, and at least one knife of each pair is radially adjustable for this purpose, that is, to cut or not to cut.

In the present invention I take advantage of this radial movement of the knife to operate a booster switch to supply the "cutting current" for the exact time that it is needed, that is, while the knife is cutting.

For this purpose current flows from line 32 through a wire 44 to a rheostat 45, and thence through a wire 46 to a stationary contact 47 mounted on a bracket 48, and insulated therefrom.

The bracket 48 may be concentrically mounted with the upper drum shaft 42, and clamped in various angular settings by the bolt 49. The bracket 48 carries a pin 50 upon which there is pivoted a lever 51, to which latter is fixed an insulated contactor 52.

The right end of the lever 51 forms a slide, or contact surface 54, which may be engaged by a pin 53 fixed in the end of the adjustable shear knife 18, when the knife is projected outwardly into cutting position; the said projection of the cutting knife 18 being made amply in advance of the cutting position.

When the knife which is set to cut (or if only one knife is used, when it is set to cut), or rather its connected pin 53 engages the surface 54 of the lever 51, the contacts 47 and 52 are closed. This action does not interfere with the bar 5, as the mechanism just described may be offset (endwise of the drum 23) to clear.

For the sake of clearness in Fig. 3, the surface or slide 54 is shown in advance of the cutting sector defined by the angle 43. This may be done if necessary to compensate for magnetic lag in the armature of motor 17, or if not, the length of the surface 54 may be made to just cover the desired portion of the arc of angle 43, and set directly in line therewith.

Having the contacts 47 and 52 closed, current can now flow through wire 55, brushes 30—30, and wire 41 to line 33, thus supplying a shot of "cutting current" just when needed. By the setting of rheostat 45 the amount of this current can be accurately set for the work (cut) to be done.

Reverting now to Fig. 1, we can trace the operation in full. The mill is started and a bar 5 comes through. With any certain pair of mill rolls 1—2 the mill speed (and bar speed) may vary, due to low steam, low voltage, cold steel, overload, and so forth, 10% or more.

Before the first bar comes through the idling speed of the motor 17 and parts driven thereby, is set by means of the field rheostat 35 to a value which will make the surface speed of the pinch rolls 3—3 and 4—4, and the shear knives 18 and 19, about 10% greater than the speed of the bar 5.

At the same time, as a result of computation or experience, the rheostat 39 is set to supply sufficient armature current to the motor 17 to drive the shear idling, and the pinch rolls in contact with the bar 5 to produce a drag or tension on the bar 5 equivalent to about 25% of the power of the motor 17. This power is not wasted, as it merely reduces the power required to drive the mill.

As long as the bar 5 is engaged by the mill rolls 1—2 they dominate the forward speed of the bar.

Until the front end of the bar 5 reaches the pinch rolls 3—3, the pinch rolls, and the connected flying shear 20, and motor 17, are running 10% (assumed) faster than the bar. When the pinch rolls 3—3 grip the bar, they will be quickly brought to the bar speed by the retarding speed of the bar, with a certain amount of initial slippage of the rolls on the bar.

The shear 20 and the motor 17 will be likewise reduced in speed, due to their geared connection with the pinch rolls 3—3 and 4—4.

Therefore, under these conditions, the rear end of the bar being in the mill rolls 1—2, and the front end in the pinch rolls 3—3 and 4—4, the bar will dominate the surface speed of the shear knives 18 and 19, which is the condition desired.

This permits the cutting of accurate length sections, provided the shear in itself can produce such accuracy when properly synchronized with the bar. Under these conditions the motor 17 will be pulling just enough to drive the shear 20 (idling), and to maintain the desired drag on the bar.

As each cutting knife comes into operation, the booster switch will supply a graduated amount of extra current to the motor 17 through the rheostat 45.

As soon as the rear end of the bar 5 leaves the mill rolls 1—2, the speed of the bar will be dominated by the pinch rolls 3—3 and 4—4, or practically by the shear 20.

Thus the bar, while in the mill rolls, dominates the speed of the shear, and as soon as the bar leaves the rolls, its speed is dominated by the shear.

Speed control thus passes automatically from the bar to the shear, but exact synchronization is always maintained between the two.

As the motor 17 is set to have a speed slightly in excess of the bar, the speed of the bar will rise somewhat as it leaves the mill rolls, but this will usually be of advantage.

Broadly speaking therefore, the present invention consists of a method, and means, for synchronizing a rotary flying shear with a moving bar, during the time the bar is in the mill rolls and after it leaves them, by using the uncontrollable speed of the bar to dominate the shear while the bar is in the mill rolls, and by using the shear and its motor, to dominate the speed of the bar after it leaves the mill rolls, and all as parts of one smoothly progressive operation.

A secondary phase of the invention consists in the use of the booster switch and its co-acting rheostat, to control the supply of "cutting current" at the exact time, and to the proper amount, to prevent the shear from "bucking" the pinch rolls.

It will be noted that the booster switch and the method of using it, are prime factors in obtaining accurate synchronization of the bar and the shear.

If ordinary motor control were used, that is, inrush of armature current to maintain motor speed, the shear speed, even if a heavy flywheel were used, would drop after each cut, and destroy the accurate speed synchronization of the bar and the shear, while the bar is still in the mill rolls.

However, with the booster switch, by proportioning the amount of current supplied as a "shot", to the amount of power required by the cut, and sending this current to the motor 17, at the exact time it is needed, there is no tendency for the shear to slow up, and the desired synchronization may be preserved indefinitely.

The word synchronization as herein used has its usual meaning of equalization, but when sections are to be cut hot, which are to be of accurate desired lengths when cold, the usual allowance for shrinkage must be made, which may readily be done by slightly increasing the diameters of the pinch rolls 3—3 and 4—4.

A further valuable characteristic of the mechanism herein disclosed is that for extremely accurate cutting or for very valuable material, a trial bar of cheap material can be passed through the pinch rolls 3—3 and 4—4 without passing through the mill rolls 1, and 2, and by the use of such a trial bar the shear can be set to any required degree of accuracy before engaging the material to be sheared.

It will be noted that the mechanism above described can be used in connection with the rolling and shearing of bars of any size from wide heavy universal mill plates, to narrow thin strip steel. It is of course necessary that the detailed design be suited to the service, but the principles of construction are such that they apply equally well to light or heavy bars, and when properly designed, the adjustments can be regulated to light delicate machinery, or to heavy mechanisms involving the use of large powers.

The drawings, although diagrammatic only, are ample to a full understanding of the principles of the invention, from which a skilled designer can build suitable machines for desired services, and with details varied to meet the requirements of the service.

In the following claims, the words "shear", or "flying shear", shall be deemed to mean a "normally stationary machine arranged to make transverse cuts on a moving bar, and comprising a pair of parallel rotary members at least one of which is provided with a shearing knife.

I claim as my invention:

1. Apparatus for shearing metal bars in motion as delivered by a rolling mill, comprising a rotary flying shear, a separate rotary gripping device, a motor for driving the shear and the gripping device, and means for dominating the surface speed of the shear knives by the rate of progression of the bar acting through the said gripping device, during the time the bar is engaged by both the mill and the shear.

2. Apparatus for shearing metal bars in motion as delivered by a rolling mill, comprising a rotary flying shear, a rotary gripping device connected to said shear and rotating in a fixed relation therewith, and a motor for driving the shear and its cutting members at a surface speed normally higher than the surface speed of the bar, whereby upon engagement of the gripping device with the bar to be sheared, a tension is induced in the bar which is used to retard the speed of the shear to a speed having a fixed relation to the speed of the bar through the gripping device.

3. Apparatus for shearing metal bars in motion and while engaged by the rolls of a rolling mill, comprising said rolling mill rolls, a gripping device arranged to continuously grip and partake of the onward motion of the bar imparted thereto by said rolls, a shear to sever it, and driving connections between the said gripping device and the shear, whereby the speed of the shear is dominated by the gripping device.

4. Mechanism for governing the speed of a flying shear with relation to the speed of a moving bar to be severed, as delivered from a rolling mill, comprising a motor geared to the shear for driving the same, a rotary gripping device located between the mill and the shear and adapted to grip the oncoming bar frictionally, and to be slowed down to the speed of the bar by such gripping action, and positive driving connections between the said gripping device and the said motor, whereby the speed of the shear depends on and is dominated by the rate of progression of the bar.

5. Apparatus for shearing metal bars in motion as delivered by a rolling mill, comprising a rotary flying shear, a motor for driving the said flying shear during the times no bar is in position to be sheared, at a surface speed substantially higher than the surface speed of the mill rolls, and means for bringing the said two speeds into a desired fixed relation between the time the front end of the bar leaves the mill rolls, and the time the said front end reaches a cutting position at the shear, to the end that accurate sections of pre-determined length may be cut from the moving bar.

6. Apparatus for the production of metal bars in accurate desired lengths including a rolling mill operating at any given time at a substantially constant delivery speed, but at other times having a higher or lower delivery speed, a rotary flying shear set in front of the delivering mill rolls and arranged to shear the bars in motion as they are delivered to it by the mill, a variable speed motor for driving the said shear, means for setting the speed of the said motor to drive the shear at a speed substantially above the surface speed of the bar as determined by its engagement with the mill rolls, and means for bringing the speed of the shear and the speed of the bar into a desired fixed relation between the time the front end of the bar leaves the mill rolls and the time it arrives at the cutting position at the shear.

7. Apparatus for shearing metal bars in motion as delivered by a rolling mill, comprising a rotary flying shear having an independent driving motor and arranged to shear the bar coming from the mill into accurate sections of pre-determined length, means for setting the said shear motor to drive the shear at a surface speed of its cutting elements substantially higher than the lineal speed of the bar, and means connected to the shear and arranged to engage the front end of the oncoming bar between the time it leaves the mill rolls and the time it arrives at a cutting position at the shear to grip the bar and put it in tension, thus retarding the speed of the shear to a speed having a desired fixed relation to the speed of the bar.

8. Apparatus for shearing metal bars in motion as delivered by a rolling mill, comprising a rotary flying shear set in front of the mill and arranged to cut equal sections of accurate length from the moving bar, a motor for driving the said shear, means for setting the said motor to drive the cutting elements of the said shear at a surface speed substantially higher than the lineal speed of the bar when the bar has not yet reached the cutting position, and automatic means for bringing the surface speed of the said cutting elements into a desired fixed relation with the lineal speed of the bar when the bar is engaged by the mill rolls and also in position to be severed by the shear.

9. Apparatus for shearing metal bars in motion as delivered by a rolling mill, comprising a rotary flying shear set in front of the mill and arranged to shear the moving bar, a motor for driving the shear, a device between the shear and the mill for putting a tension on the bar between the said device and the mill, and driving connections between the said device and the shear whereby the said tension in the bar will operate to bring the surface speeds of the shear and the bar into a desired fixed relation, and so maintain them during the cutting period of the said bar.

10. Apparatus for shearing metal bars in motion as delivered intermittently by a rolling mill to a rotary flying shear, comprising means for operating the shear so that its cutting elements rotate at a surface speed substantially higher than the normal lineal speed of the bar during the idle intervals between the passage of the successive bars, and means for bringing these two speeds into a desired fixed relation before the front end of each oncoming bar reaches the shearing position.

11. Apparatus for shearing metal bars in motion as delivered from a rolling mill, comprising a rotary flying shear for severing the bar, a gripping device located between the mill and the shear for gripping the bar, a motor for driving the shear, driving connections between the said motor and the said shear, driving connections between the said motor and the said gripping device, means for supplying a normal amount of current to the said motor to carry the idling load between cuts, and automatic means for supplying a regulated amount of extra current in proportion to the cut to be made, and at the instant of cutting.

12. Apparatus for shearing metal bars in motion as delivered from a rolling mill, comprising a rotary flying shear for severing the bar, a gripping device located between the mill and the shear for gripping the bar, a motor for driving the shear, driving connections between the said motor and the said shear, driving connections between the said motor and the said gripping device, a circuit supplying current for the normal operation of the said motor between cuts, a second circuit for supplying extra current to the said motor during the cutting period, and an automatic booster switch controlling the said second circuit.

13. Apparatus for shearing metal bars in motion as delivered from a rolling mill, comprising a rotary flying shear for severing the bar, a gripping device located between the mill and the shear for gripping the bar, a motor for driving the shear, driving connections between the said motor and the said shear, driving connections between the said motor and the said gripping device, a circuit supplying current for the normal operation of the said motor between cuts, a second circuit for supplying extra current to the said motor during the cutting period, and means positively operated by the knife next to cut for controlling the said second circuit.

14. Apparatus for shearing moving metal bars as delivered by a rolling mill, comprising a rotary flying shear, a rotary gripping device driven by the shear and arranged to grip the oncoming bar and tie it to the shear in a definite speed relation, a motor for driving the shear and the gripping device, means for controlling the current supply to the said motor to maintain the said definite speed relation under idling conditions, or between cuts, and controlling means for supplying to the said motor a "shot" of extra power at the instant of cutting, and in an amount proportioned to the requirements of the cut to be made.

15. Apparatus for shearing metal bars in motion as delivered by a rolling mill, comprising the combination of the mill and its driving means, a rotary flying shear, a separate rotary gripping device in driving connection with the shear and synchronized therewith as to its surface speed, and a variable speed adjustable torque motor for driving the shear and the gripping device, whereby the surface speed of the shear knives is constantly synchronized with the surface speed of the bar to be sheared, by first dominating the speed of the shear by the speed of the bar while the bar is engaged by the mill rolls, and second, by dominating the speed of the bar by the speed of the shear and gripping device when the bar leaves the mill rolls.

16. Apparatus for shearing metal bars in motion as delivered by a rolling mill, comprising the combination of a rotary flying shear, a rotary gripping device between the mill and the shear, and in driving connection with the shear, and synchronized therewith as to its surface speed, and means for driving the shear and the rotary gripping device; the said means having independent adjustments for speed and torque.

WALTER W. MACFARREN.